US012741286B2

(12) United States Patent

Kuopanportti et al.

(10) Patent No.: US 12,741,286 B2

(45) Date of Patent: Sep. 22, 2026

(54) METHOD AND APPARATUS FOR SEPARATING VALUABLE MINERALS FROM ORE

(71) Applicant: Kaakkois-Suomen Ammattikorkeakoulu Oy, Mikkeli (FI)

(72) Inventors: Hannu Kuopanportti, Mikkeli (FI); Teijo Linnanen, Mikkeli (FI)

(73) Assignee: Kaakkois-Suomen Ammattikorkeakoulu Oy, Mikkeli (FI)

( * ) Notice: Subject to any disclaimer, the term of this patent is extended or adjusted under 35 U.S.C. 154(b) by 468 days.

(21) Appl. No.: 18/257,269

(22) PCT Filed: Dec. 13, 2021

(86) PCT No.: PCT/IB2021/061629

§ 371 (c)(1),
(2) Date: Jun. 13, 2023

(87) PCT Pub. No.: WO2022/130168

PCT Pub. Date: Jun. 23, 2022

(65) Prior Publication Data

US 2024/0100540 A1 Mar. 28, 2024

(30) Foreign Application Priority Data

Dec. 14, 2020 (FI) ..................................... 20206294

(51) Int. Cl.
*B03B 7/00* (2006.01)
*B02C 23/12* (2006.01)
(Continued)

(52) U.S. Cl.
CPC ................ *B03B 7/00* (2013.01); *B02C 23/12* (2013.01); *B03D 1/02* (2013.01); *B03D 1/08* (2013.01); *B03D 1/24* (2013.01); *B03D 2203/02* (2013.01)

(58) Field of Classification Search
None
See application file for complete search history.

(56) References Cited

U.S. PATENT DOCUMENTS

| | | | |
|---|---|---|---|
| 4,721,256 | A | 1/1988 | Lyman |
| 5,837,210 | A | 11/1998 | Simmons et al. |

(Continued)

FOREIGN PATENT DOCUMENTS

| | | | |
|---|---|---|---|
| CN | 104148164 | A | 11/2014 |
| EP | 2928585 | B1 | 3/2018 |

(Continued)

OTHER PUBLICATIONS

A. Rieger et al., "Mine water treatment by membrane filtration processes—Experimental investigations on applicability", Desalination and Water Treatment, No. 6, Apr. 8, 2009, pp. 54-60.

(Continued)

*Primary Examiner* — Peter Keyworth
(74) *Attorney, Agent, or Firm* — Nixon & Vanderhye PC

(57) ABSTRACT

The invention relates to a method for a beneficiation process of minerals wherein: ore which contains valuable ore of too large a particle size is returned to a comminuting step, and the ore of the desired particle size is directed onwards to the following step of the method, where the comminuted ore is beneficiated by flotation for separating valuable minerals; and, in order to displace oxygen, carbon dioxide oversaturated water and/or carbon dioxide gas is fed to at least one of the following process steps: ore comminution, classification of commi¬nuted ore, intermediate step between comminution and classification, feeding of the comminution and/or classification.

5 Claims, 5 Drawing Sheets

(51) Int. Cl.

| | |
|---|---|
| ***B03D 1/02*** | (2006.01) |
| ***B03D 1/08*** | (2006.01) |
| ***B03D 1/24*** | (2006.01) |

(56) References Cited

U.S. PATENT DOCUMENTS

| | | | | |
|---|---|---|---|---|
| 6,210,648 | B1 | 4/2001 | Gathje et al. | |
| 7,789,332 | B2 | 9/2010 | Heimala et al. | |
| 10,357,783 | B2 | 7/2019 | Lakanen et al. | |
| 2013/0200182 | A1 | 8/2013 | Martins et al. | |
| 2014/0131280 | A1 | 5/2014 | Haseneder et al. | |
| 2017/0197221 | A1* | 7/2017 | Lakanen | B03D 1/028 |
| 2021/0032125 | A1* | 2/2021 | Worley | C02F 1/385 |
| 2021/0101091 | A1 | 4/2021 | Ryan | |

FOREIGN PATENT DOCUMENTS

| | | | |
|---|---|---|---|
| EP | 2670532 | B1 | 9/2019 |
| FI | 120187 | B | 7/2009 |
| FI | 124945 | B | 3/2015 |
| FI | 125619 | B | 12/2015 |
| GB | 982693 | A | 2/1965 |
| GB | 2522777 | A | 8/2015 |
| JP | 2012055867 | A | 3/2012 |
| RU | 2108974 | C1 | 4/1998 |
| WO | 2011/095685 | | 8/2011 |
| WO | 2015007955 | A1 | 1/2015 |

OTHER PUBLICATIONS

International Search Report and Written Opinion of the ISA for PCT/IB2021/061629 mailed Jul. 1, 2022, 20 pages.
Finland Search Report for FI20206294 dated Jul. 6, 2021, 2 pages.
International Preliminary Report on Patentability with Amended Sheets for PCT/IB2021/061629, mailed Mar. 9, 2023, 32 pages.
Written Opinion of the International Preliminary Examining Authority for PCT/IB2021/061629 mailed Oct. 27, 2022, 5 pages.
Feb. 24, 2025 Office Action issued in Chilean Patent Application No. 202301741, pp. 1-16 [English translation included].

* cited by examiner

METHOD AND APPARATUS FOR SEPARATING VALUABLE MINERALS FROM ORE

CROSS-REFERENCE TO RELATED APPLICATIONS

This application is the U.S. national phase of International Application No. PCT/IB2021/061629 filed Dec. 13, 2021, which designated the U.S. and claims priority to FI20206294 filed Dec. 14, 2020, the entire contents of each of which are hereby incorporated by reference.

BACKGROUND OF THE INVENTION

The invention relates to the extractive industry, in particular to separating minerals from ore, including as its main steps comminuting the ore followed by flotation beneficiation so that valuable minerals may be separated from mineral sludge, that is, supply sludge. The goal of the operation is to be able to separate valuable matter such as metal from ore in order to create a concentrate whose concentration is high enough for further processing. Flotation beneficiation, or flotation, is based on that gas bubbles created in flotation and rising towards the liquid surface of a flotation cell may stick to the surface of the minerals included in the supply sludge, if the surface tension of the mineral is lower than the surface tension of the flotation liquid (water i.e. the water contained by the mineral sludge). Flotation beneficiation is best suited to separating such minerals that are naturally hydrophobic, that is, water-repellent.

In the prior art methods and apparatuses, a drawback exists in the difficulty of controlling the process, which in turn is due to the surfaces of the particles produced in comminution oxidizing uncontrollably, and thus there are oxidation products attaching on the particle surfaces. This also leads to the exposure of the apparatus to corrosion, and an increase in the consumption of flotation chemicals. A further problem is the deterioration of the flotation result, which is also evidenced by the content of the oxidation products of minerals dissolved in the process water, such as that of metals, for example, as well as the content of oxidation products of sulphites, such as sulphates, in the process water increase, which in turn makes the treatment and circulation of process waters more difficult.

BRIEF DESCRIPTION OF THE INVENTION

It is therefore an object of the invention to develop a method and an apparatus implementing the method so that the aforementioned problems may be solved or reduced. The object of the invention is achieved by a method and system which are characterized by what is disclosed in the independent claims. Preferred embodiments of the invention are disclosed in the dependent claims.

The invention is based on comminuting ore that contains valuable minerals and modifying the conditions of flotation beneficiation.

An advantage of the method and apparatus according to the invention is a better control of the process and the process becoming more effective. By means of the invention, it is possible to prevent the uncontrollable oxidation of the surfaces of minerals produced in comminution and their turning unadvantageous from the flotation viewpoint. The invention is easily utilisable either in entirely new apparatuses or for updating/complementing existing flotation processes. Further advantages of the invention in flotation beneficiation is the improved yield and selectiveness of valuable minerals, as well as a substantial reduction of substances dissolved from ore. In addition, by means of some embodiments of the invention, it is possible to improve the stability of used tailings, the predictability and closing rate of water balance.

BRIEF DESCRIPTION OF THE DRAWINGS

The invention will now be described in more detail in connection with preferred embodiments and with reference to the accompanying drawings, in which.

DETAILED DESCRIPTION OF THE INVENTION

Figure 1:
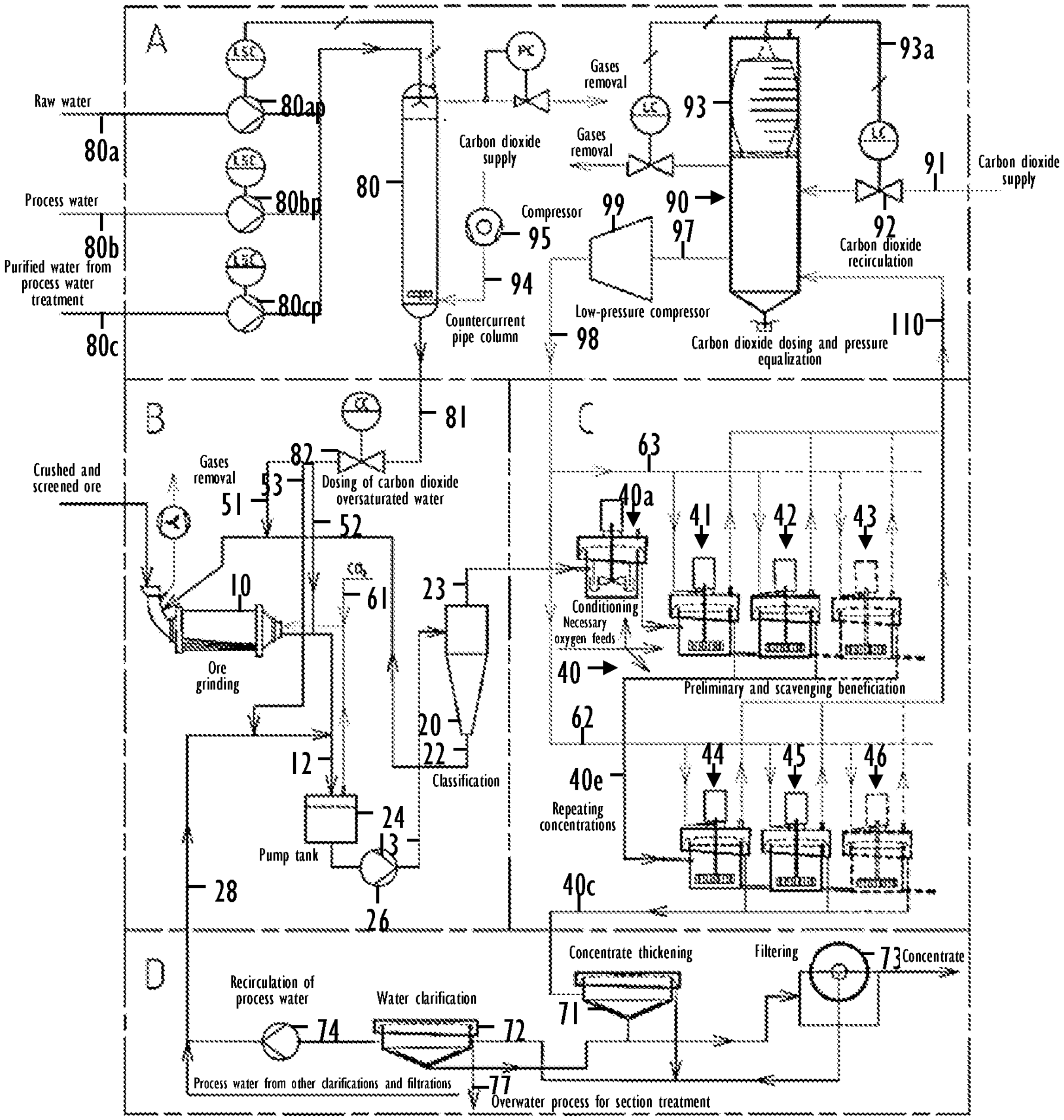
FIG. 1 shows an apparatus using wet comminution.

Referring to FIG. 1, this is a mineral beneficiation system for separating valuable minerals from ore. In FIG. 1, the functional subassemblies of the beneficiation system are the following blocks A to D: block A comprising a carbon dioxide supply and circulation system, block B comprising ore comminution and classification, flotation beneficiation block C of mineral/ore, implemented with closed carbon dioxide circulation, and block D comprising mineral precipitation and process water circulation. Block A may also be described as a carbon dioxide beneficiation unit for producing and/or moving carbon dioxide gas and/or carbon dioxide oversaturated water. The apparatus according to an embodiment of the apparatus comprises a carbon dioxide beneficiation unit which may be a fixed part of the beneficiation system or an apparatus connected to it.

The beneficiation system comprises a comminuting device 10 to comminute ore that includes valuable minerals. In the example of FIG. 1, the comminuting device 10 is a wet comminuting device.

In addition, the beneficiation system comprises a classifier 20 which is arranged to separate ore of too large a particle size to be returned to the comminuting device, and the classifier 20 is also arranged to pass on ore of the desired particle size. An example of a classifier 20 may be a hydro cyclone. In an embodiment, a suitable limit for the particle size is approximately 0.1 mm, on average, (which is a size distribution), that is, ore particles larger than that are returned back to the comminuting device 10 through a return channel 22. It is noted that between the comminuting device 10 and classifier 20 there may be a pump tank 24 and a pump 26 through which the ore sludge formed as a mixture of water (carbon dioxide oversaturated water) and comminuted ore.

The beneficiation system additionally comprises a flotation beneficiation arrangement 40 to separate valuable minerals from comminuted ore. In an embodiment, the flotation beneficiation arrangement 40 comprises flotation beneficiation cell 41-43, 44-46, of which the cells 41-43 may be preliminary and scavenging cells, and the cells 44-46 may be repeating beneficiation cells. Reference number 40*a* shows a conditioning device, belonging to the flotation beneficiation arrangement and implemented by a paddle mixer, for example.

To displace oxygen from the apparatus, the beneficiation system comprises one or more inlets for carbon dioxide gas and/or pressurised carbon dioxide oversaturated water through which carbon dioxide gas and/or carbon dioxide oversaturated water is transferred from the carbon dioxide beneficiation unit to one or more of the process steps described in the above: comminution, screening, flotation beneficiation. In FIG. 1, inlets for pressurised carbon dioxide oversaturated water are denoted with reference numbers 51-53 and inlets for carbon dioxide gas are denoted with reference numbers 61-63.

Insofar as the method is concerned, this is a method for separating valuable minerals from ore. The method comprises the steps of: comminuting ore that contains valuable minerals by wet comminuting (FIG. 1, comminuting device 10) or by dry comminuting (FIG. 2), followed by carrying out a classification by a classifier 20 where ore of too large a particle size is returned through the channel 22 to the comminuting step, that is, the comminuting device 10, and the ore of the desired particle size is directed onwards to the following step of the method, where in a flotation beneficiation arrangement 40 the comminuted ore is beneficiated by flotation for separating valuable minerals as shown in block C of FIG. 1. The concentrate still requiring further processing is received in a channel 40*c* through which it proceeds to block D where the beneficiation system comprises a thickener 71 for the concentrate, water clarifier 72 and a filter 73 from whose outlet side the finished concentrate is obtained. In addition in block D, the beneficiation system comprises a pump 74 for circulating process water through a channel 28 comprised by the beneficiation system to, for example, a pump tank 24 in a channel 12 between the comminuting device 10 and classifier 20. Reference number 77 denotes a channel for overwater from the water clarifier 72, which is passed on to process water treatment.

In an embodiment, the method comprises post-treatment of the process water of the flotation beneficiation process, in which continuous nanofiltration 400 is carried out for the process water, by means of which substances dissolved in the process water are separated from it. Continuous nanofiltration may be provided with prefiltration. Filter films may be surface-charged whereby positively surfacecharged filter films, for example, may reject positive metal ions.

Figure 4:
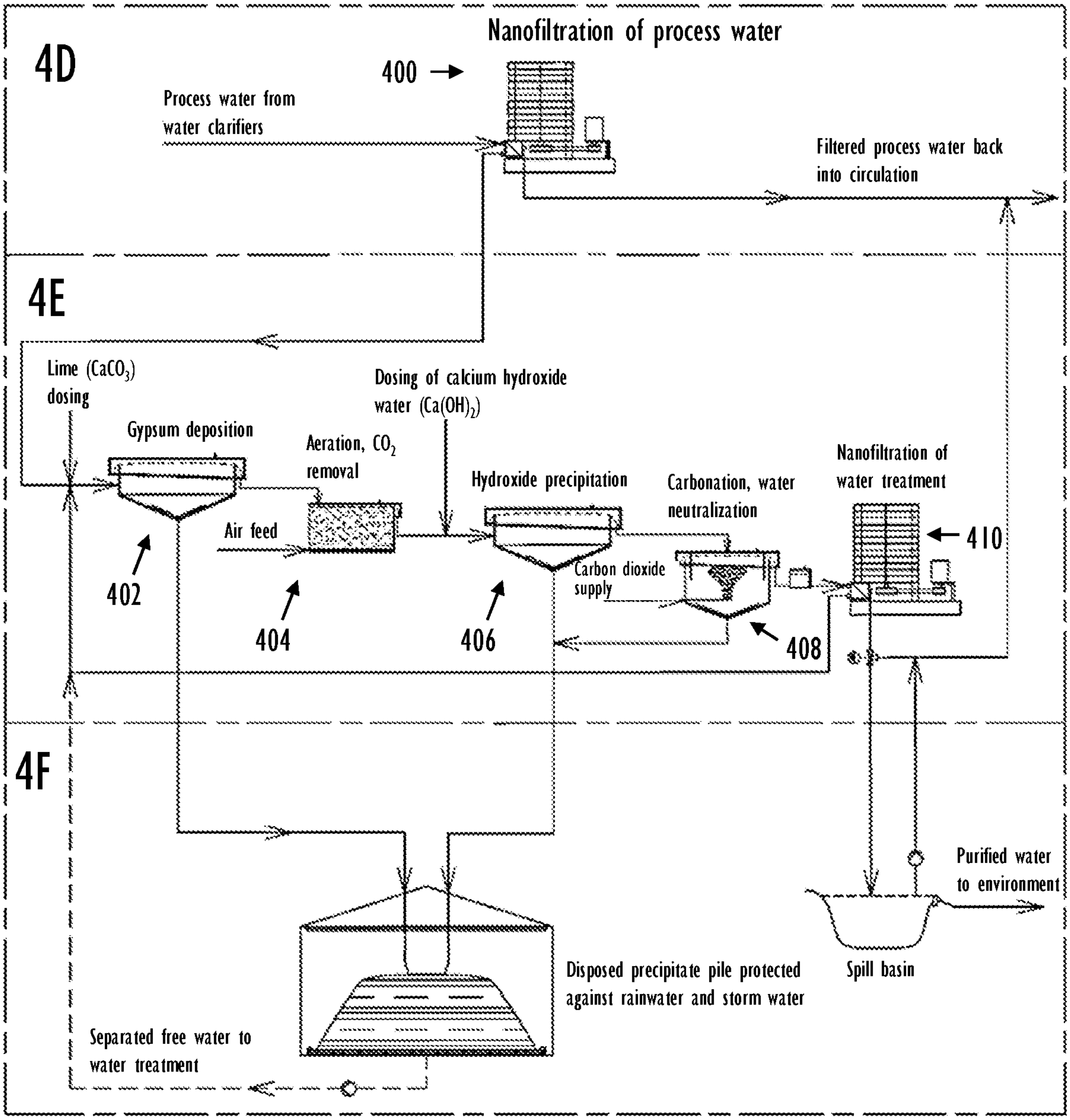
FIG. 4 shows treatment of process waters.

The overwater that was led out of block D of FIG. 1 proceeds to process water treatment shown in FIG. 4. In FIG. 4 block 4D, with the continuous nanofiltration 400 following clarification of process water it is possible, in a practical manner, to separate substances dissolved in the process water from it, and to increase the usability of filtered water at a beneficiation plant. Correspondingly, with this nanofiltration the amount of water going to water treatment is further reduced (retentate of filtration) and the contents of dissolved substances included in it are concentrated, such as sulphate and metal ion content, which is important in water treatment with the sizes and precipitation delays of precipitation basins in mind.

In an embodiment of the method, the post-treatment of process water additionally comprises: gypsum precipitation 402, aeration 404, hydroxy precipitation 406, carbonation precipitation 408, and a second nanofiltration 410 by means of which substances dissolved in the process water are separated from it. In block 4E, in precipitation basins covered from rainwater, it is possible to carry out in series, that is, successively gypsum precipitation 402, aeration 404, hydroxy precipitation 406, carbonation precipitation 408, and nanofiltration 410 to achieve effective precipitation of process water and its high-degree purification result. FIG. 4 block 4F shows dumping of precipitates formed in water treatment, returning water for treatment, and releasing purified water to the environment.

In gypsum precipitation, most of the solids contained in process water are precipitated, such as sulphates and metal ions. Due to using inert carbon monoxide gas, the water going to precipitation has less sulphate and metal ions than in case of the conventional oxidising air flotation beneficiation. As a result, hydroxy precipitation may be utilised more efficiently than previously for precipitating soluble metals after gypsum precipitation. Hydroxy precipitation is effective for precipitating dissolved metal ions, because the solubility of a plurality of metal ions is small in the vicinity or approximately pH 10, whereby they precipitate from water as metal hydroxides, such as magnesium as magnesium hydroxide. Carbon dioxide and various stink gases may be removed, or stripped, from the water prior to hydroxy precipitation by aeration, for example, whereby consuming hydroxide in the carbonate reaction may be avoided, and oxidise the soluble gypsum in the water into a more precipitating form. In the carbonisation precipitation following hydroxy precipitation, carbon dioxide is fed into the water, causing the pH of the water to decrease, for example close to neutral level, and the calcium carbonate formed in the reaction binds, when crystallising from water, heavy metals, such as arsenic and antimony, which are difficult to precipitate by gypsum precipitation. In carbonation precipitation, a rapid reaction between alkaline water and carbon dioxide may be carried out, for example, in a basin, whereby the precipitation of the forming lime on the wall surfaces in this step is avoided. Finally, the water that has flowed through the precipitations steps may be nanofiltered to prevent high-soluble gypsum (approximately 2 g/l at a temperature of 20° C.) from water treatment to the water that is led to the environment or reused at a beneficiation plant. In addition, it helps remove water from the precipitation circulation of water treatment.

When purified water is reused in a beneficiation plant, this may lead to less raw water usage and at the same time water led to the environment may be reduced. When circulation of process water and water treatment are performed efficiently in connection with the beneficiation plant of a mine, process waters may be so treated that it is possible to part with large-sized, uncovered precipitation basins.

By-products of the process must be treated in an environmentally safe manner, because the fine material produced is often reactive. Optimally, of all the product flows of a beneficiation plant, the usable part is utilised. Circulation of process waters may be closed so that before reuse chemically valuable constituents and those potentially interfering with the operation of the process are separated from the circulation water. The unutilised moist precipitate may be dumped, or granulated and stabilised for use in filling up the mine or in environmental construction, for example.

The concentrates to be dumped during dumping must be temporarily protected against rainwater, so that rainwater cannot wash away substances bound in them, such as sulphates and metals. Usually, dumping piles are left without protection from rainwater, whereby most of them will dissolve back to the mine area for processing. When repeated, this will turn into water treatment problems. Stormwater must be diverted away from the pile, for example by making an impermeable base for the precipitate pile, the sides of which have been provided with the opportunity to collect the separated free water back to water treatment.

This way, the dumping precipitate pile will dry, compact, and harden over time in the air protected from rainwater. If the intention is not to use the dumping pile any more, the dumping pile may be protected at its surface with a hardening and water-impermeable surface material such as hardening gypsum or similar concrete. Hardening, hemihydrate gypsum for the purpose may be manufactured, for example, from the gypsum produced in gypsum precipitation by heat treating it at 140° C.

In an embodiment of the invention, to displace oxygen in the steps of the method, such as ore comminution, the classification of comminuted ore, the intermediate step between comminution and classification, or the supply of comminution and classification, carbon dioxide gas and/or pressurised carbon dioxide oversaturated water are used to displace oxygen. In an embodiment, the beneficiation system comprises at least one inlet 61 for carbon dioxide gas and at least one inlet 51 for pressurised carbon dioxide oversaturated water. The aforementioned carbon dioxide beneficiation unit may be hooked up to these inlets. In an embodiment, the carbon dioxide released in the beneficiation process of minerals is circulated back to the beneficiation process, in other words, this is a closed carbon dioxide circulation. The recovery of carbon dioxide from the flotation beneficiation process is implemented by a recycling arrangement 110.

To produce pressurized oversaturated water, the beneficiation system in an embodiment comprises a countercurrent bubble column 80 which is by means of a distribution channel 81 connected to one or more inlets 51-53 for supplying carbon dioxide oversaturated water. The beneficiation system comprises a dosing valve 82 for the distribution channel 81. For the column 80, an embodiment has various kinds of water inlets, that is, inlet 80 of raw water, inlet 80*b* for a process water of the beneficiation system, and inlet 80*c* for purified water from the treatment of process waters. There are pumps 80*ap*, 80*bp*, 80*cp* for the inlets 80*a*, 80*b*, 80*c* to the column 80, each of the pumps being arranged to pump water to the top part of the column 80. Therefore, in an embodiment, the pressurised carbon dioxide oversaturated water made by using the countercurrent bubble column is made of fresh water and/or process waters circulated in the method.

Ore may be comminuted when wet by using inert grinder pieces, that is, by autogenous grinding or by using iron grinder pieces in an inert carbon dioxide atmosphere. An example of a wet comminuting device is a ball crusher. Because in the example of FIG. 1 the comminuting device is a wet comminuting device, then in an embodiment an inlet, that is, the inlet 51 for pressurized carbon dioxide oversaturated water is arranged to carry pressurized carbon dioxide saturated water to the wet comminuting device 10 from the column 80 through, for example, the distribution channel 81 and valve 82. The inlet 51 for pressurized carbon dioxide oversaturated water is in contact with the inlet side of the ore comminuting device 10, through the return channel 22 of the classifier 20, for example, as in FIG. 1. The second inlet 52 and third inlet 53 for pressurized carbon dioxide oversaturated water is arranged to bring pressurized carbon dioxide saturated water to the classifier through the pump tank 24 and pump 26 in the example of FIG. 1. Between the comminuting device 10 and classifier 20 there is a channel structure 12, 13 and pump tank 24 and pump 26 referred to in the above. The classifier 20 and flotation beneficiation arrangement 40 are connected through the channel 23. The carbon dioxide oversaturated water used in the flotation beneficiation step is the water that was used in the ore wet comminution step and/or ore classification step.

The carbon dioxide gas is obtained from a gas system 90 for which there is an external carbon dioxide supply 91 and valve 92. In connection with the gas system, an embodiment has a pressure balancing arrangement 93 (a gas-tight sack or other structure filling in the ambient atmospheric pressure), to be explained in more detail below. The gas system 90 and the bottom part of the column 80 may be connected through a channel 94, in addition to which there may be a compressor 95. This way the countercurrent bubble column 80, which produces pressurized carbon dioxide oversaturated water, makes water go to the top of the column 80, and the carbon dioxide gas to the bottom of the column 80, whereby a countercurrent is created.

The gas system 90 providing carbon dioxide and the flotation beneficiation arrangement 40 are connected through the channel structure 97-98, in addition to which there may be a compressor 99 such as low-pressure compressor.

Reference number 61 denotes a carbon dioxide inlet on the outlet side of the comminuting device. Other inlets (inlet structure e.g. pipe fitting) for feeding carbon dioxide are denoted by the aforementioned reference numbers 62-63 through which carbon dioxide through the aforementioned channel structure 97-98 has access to the cells 41-43, 44-46 of the flotation beneficiation arrangement.

When examined as a method, in an embodiment carbon dioxide oversaturated water and/or carbon dioxide gas is fed both to the ore comminution step and ore classification step. In an embodiment of the method, carbon dioxide is also fed to the flotation beneficiation step to displace oxygen, as a gas and/or oversaturated water. In an embodiment, to displace oxygen the method makes use of both carbon dioxide gas and carbon dioxide oversaturated water, and each step of the method (comminution, classification, flotation beneficiation) at least one the ways referred to is used to displace oxygen.

In an embodiment disclosed in closer detail, in one or more steps of the method both of said ways are used to displace oxygen. Consequently, comminution, for example, may have the use of pressurized carbon dioxide oversaturated water from the carbon dioxide beneficiation unit through the inlet 51 and the use of carbon dioxide gas through the inlet 61. Flotation beneficiation (flotation beneficiation arrangement 40) may have supply of carbon dioxide through inlet 62, 63 and the use of pressurized oversaturated water, in other word, water is used that was already obtained for classification (classifier 20) through inlets 52 or 53, and/or water is used that was already obtained for comminution (comminuting device 10) through inlet 51.

With the method/carbon dioxide beneficiation unit, the uncontrolled oxidation of the surfaces of ore particles created in comminution and their turning unadvantageous from the viewpoint of flotation may be prevented. When comminution no longer produces oxidation products that change or smooth out the properties of mineral surfaces or the aqueous phase, flotation may be carried out with substantially fewer chemicals and smaller chemical doses. This in turn allows the use of nanofiltration in the post-treatment and the use of smaller beneficiation basins. Depending on the natural characteristics of minerals, flotation may be carried out on the basis of the natural hydrophobicity of minerals, or carried out by adjusting the conditions without the need of collector chemicals. Also when using collector chemicals, such as xanthan chemicals, excessive oxidation may be harmful because a thick layer of oxidation products may prevent the adsorption of the collector, or the collector cannot change the adsorbed layer to hydrophobic. In wet comminution according to FIG. 1, wet comminution creates a non-oxidizing condition in wet comminution by using a liquid phase converted oxygen-free by carbon dioxide flushing (in column 80) through the inlet 51 and by additionally using, if necessary, carbon dioxide gas through inlet 61.

In an embodiment the beneficiation system is such that the beneficiation system comprises a circulation arrangement 110, 90 to circulate the carbon dioxide obtained from the flotation beneficiation arrangement 40 for reuse in the beneficiation system. The circulation arrangement comprises a channel structure 110 by means of which the carbon dioxide may be collected from the cells 41-43, 44-46 of the flotation beneficiation arrangement for the gas system 90 which may be interpreted as being part of the circulation system. Carbon dioxide may be further led from the gas system 90 both to the column 80 through the channel 94 and compressor 95 and also back to the flotation arrangement 40 through the channel structure 97-98 and the inlets 62, 63 at their ends. When viewed as a method, the method involves circulating the carbon dioxide output from the flotation beneficiation step back for use, for example to the flotation beneficiation step for the flotation beneficiation arrangement 40 and/or column 80 where carbon dioxide oversaturated pressurised water is made. A connecting channel 40*e* connects the cell groups of different flotation steps.

In an embodiment, the beneficiation system comprises a pressure balancing arrangement 93, 93*a* (channel), 92 (valve) to perform pressure balancing to balance the gas pressure of the flotation beneficiation arrangement 40 to substantially match the ambient normal atmospheric pressure. The structural member 93 of the pressure balancing systems is a gas-tight sack or another structure filling in the ambient atmospheric pressure.

The characteristic relating to pressure balancing and the characteristic relating to circulation interpreted together means that in an embodiment the beneficiation system is such that the pressure balancing system belongs to the carbon dioxide circulation arrangement 110, 90 and that the circulation of the carbon dioxide obtained from the flotation beneficiation arrangement 40 is arranged to proceed through the pressure balancing arrangement 93, 90.

Pressure balancing and the pressure balancing arrangement provides the opportunity to treat the volume changes made by the water levels of the flotation cells 41-43, 44-46 in the gas circulation without the need to blow out gas, an additional advantage is that it is simple to adjust the amount of gas needed in the gas circulation.

When examining the method, in an embodiment the method comprises a step where pressure balancing is carried out to balance the gas pressure of flotation beneficiation cells used in flotation beneficiation to substantially match the normal ambient air pressure so that the effect of the change in the water level of the flotation cells on the volume of air circulation may be compensated for without the need to blow out gas; the output carbon dioxide from the flotation beneficiation step is circulated back to the flotation beneficiation step through the pressure balancing arrangement.

In an embodiment the beneficiation system comprises a circulation arrangement for circulating the water used in the flotation beneficiation arrangement for reuse in the beneficiation system. From the viewpoint of the method, this means that in the method the water used in the flotation beneficiation step is circulated to be reused. Structures allowing water circulation may be considered to be the channel 28 arranged to bring process water to the channel 12 between the comminuting device 10 and classifier 20. In addition, structures allowing the water circulation in question may be considered to include inlets 80*b*, 80*c* which bring circulated water to the column 80.

Figure 2:
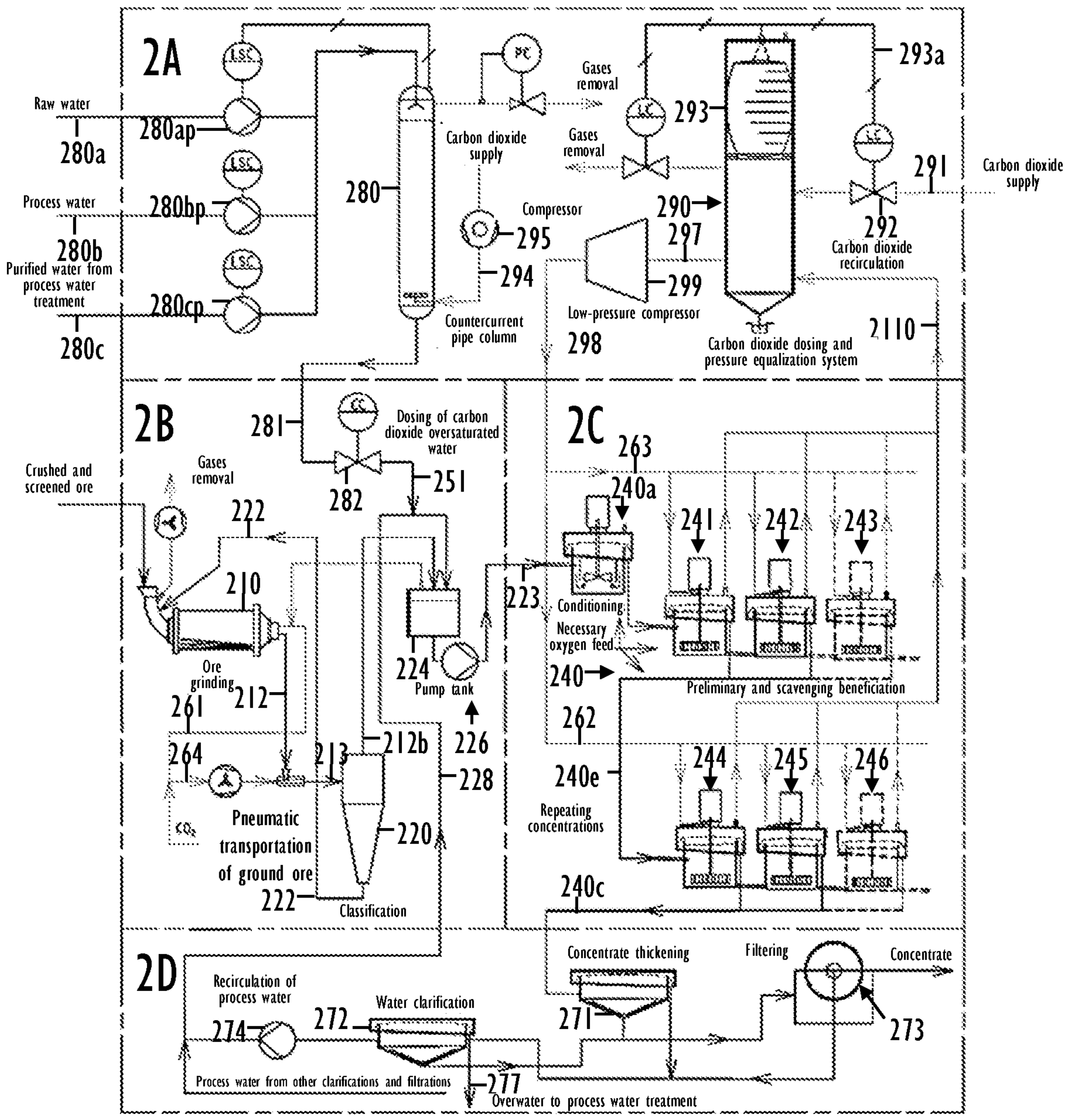
FIG. 2 shows an apparatus using dry comminution.

Discussed next is the embodiment shown in FIG. 2, which differs from the embodiment according to FIG. 1 mainly in that the comminution in FIG. 2 is performed as dry comminution with a comminuting device 210, which, as mentioned in the above, is a dry comminuting device, so as relates to the invention, comminution uses carbon dioxide atmosphere instead of carbon dioxide oversaturated water.

This being the case, as relates to FIG. 2, too, reference is mainly made to the description in the above, disclosed in connection with FIG. 1. In FIG. 2, the functional subassemblies of the beneficiation system are the following blocks 2A to 2D: block 2A comprising a carbon dioxide supply and circulation system, block 2B comprising ore comminution and classification, flotation beneficiation block 2C of mineral/ore, implemented with closed carbon dioxide circulation, and block 2D comprising mineral precipitation and process water circulation. The beneficiation system comprises a comminuting device 210 to comminute ore including valuable minerals. In the example of FIG. 1, the comminuting device 210 is a dry comminuting device. In addition, the beneficiation system comprises a classifier 220 which is arranged to separate ore of too large a particle size to be returned to the comminuting device 210 through a return channel 222, and the classifier 220 is also arranged to pass on ore of the desired particle size to the flotation arrangement 240. Between the classifier 220 and flotation beneficiation arrangement 240 is a pump tank 224 and pump 226 whose position differs from pump tank 24 and pump 26 in FIG. 1, that is, in FIG. 2 the pump tank 224 and pump 226 are only after the classifier 220. The comminuting device 210 and classifier 220 are connected with channels 212-213.

The beneficiation system in FIG. 2 additionally comprises a flotation beneficiation arrangement 240 to separate valuable minerals from the comminuted ore. In an embodiment, the flotation beneficiation system 240 comprises flotation beneficiation cell 241-243, 244-246, of which the cells 241-243 may be preliminary and scavenging cells, and the cells 244-246 may be repeating beneficiation cells. Reference number 240*a* shows a conditioning device, belonging to the flotation beneficiation arrangement 240, which may be implemented by a paddle mixer, for example.

To displace oxygen from the beneficiation system, the beneficiation system comprises one or more inlets for carbon dioxide gas and/or pressurised carbon dioxide oversaturated water which is produced in the carbon dioxide beneficiation unit or transferred by means of it. The carbon dioxide beneficiation unit may be an integral part of the beneficiation system or an external unit connected to it. In FIG. 2, the inlet from pressurised carbon dioxide oversaturated water is denoted by reference number 251 and inlets for carbon dioxide gas are denoted by reference numbers 261-264.

As illustrated by FIG. 2, the concentrate requiring further processing is received in a channel 240*c* through which it proceeds to block 2D where the beneficiation system comprises a thickener 271 for the concentrate, water clarifier 272 and a filter 273 from whose outlet side the finished concentrate is obtained. In addition in block 2D the beneficiation system comprises a pump 274 for circulating process water through a channel 228 comprised by the beneficiation system to, for example, a pump tank 224 which is after the classifier 220 and channel 212*b*. The channel 212*b* connects the classifier 220 and pump tank 224. Reference number 277 denotes a channel for overwater from the water clarifier 272, which is passed on to process water treatment as shown in connection with FIGS. 1 and 4.

In FIG. 2, the beneficiation system comprises a counter-current bubble column 280 which is by means of a distribution channel 281 connected to one or more inlets 251 for feeding carbon dioxide oversaturated water. The beneficiation system comprises a dosing valve 282 for the distribution channel 281. For the column 280, an embodiment has various kinds of water inlets, that is, inlet 280*a* of raw water, inlet 280*b* for a process water of the beneficiation system, and inlet 280*c* for purified water from the treatment of process waters. There are pumps 280*ap*, 280*bp*, 280*cp* for the inlets 280*a*, 280*b*, 280*c* to the column 280, each of the pumps being arranged to pump water to the top part of the column 280.

Ore may be comminuted when dry by using inert grinder pieces, that is, by autogenous grinding or by using iron grinder pieces in an inert carbon dioxide atmosphere. An example of a dry comminuting device is a rod mill. Because in the example of FIG. 2 the comminuting device is a dry comminuting device, then in an embodiment an inlet, that is, inlet 261 for carbon dioxide gas is arranged to carry carbon dioxide gas to the dry comminuting device 210. A second inlet for carbon dioxide gas, that is, inlet 264, is arranged to carry carbon dioxide gas on the outlet side of the comminuting device 210 to the channel structure 212-213 which leads further to the classifier 220. The inlet 251 of pressurized carbon dioxide oversaturated water is connected to the pump tank 224 where ore sludge, now wetted by carbon dioxide oversaturated water, is led by a pump 226 to the flotation beneficiation arrangement 240 through a channel 223.

Figure 3:
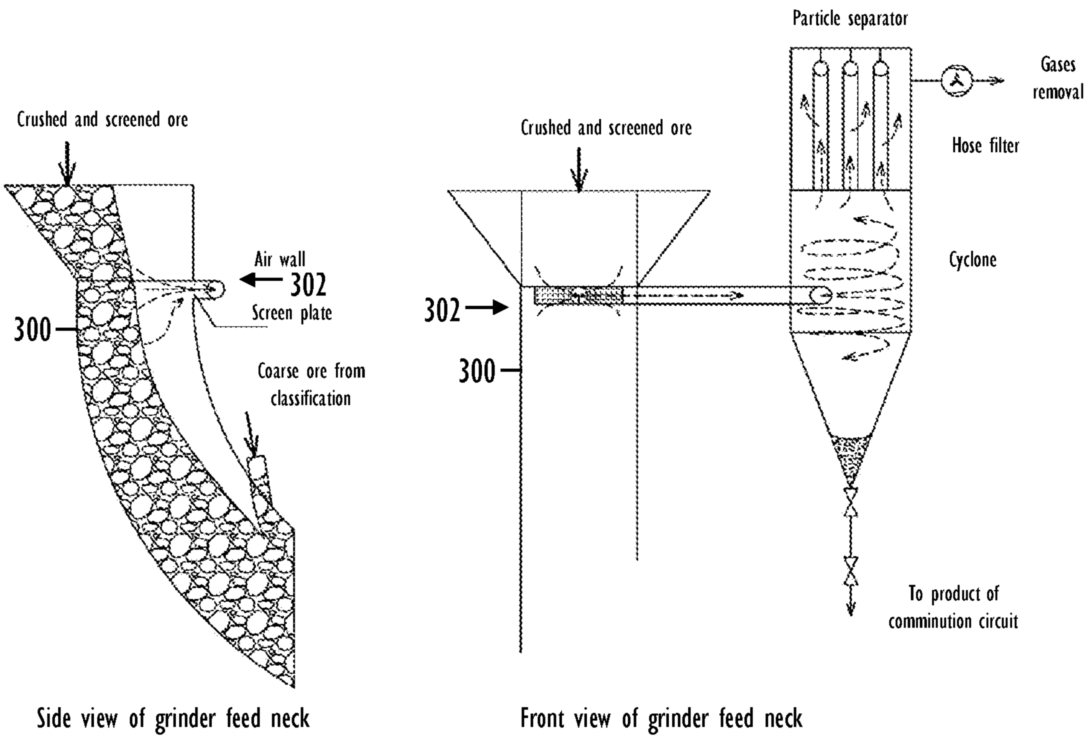
FIG. 3 shows an ore feeding neck of a grinder from the side and front.

FIG. 3 shows an ore feeding neck 300 of a grinder from the side and front. In an embodiment of the method, an air wall is generated to the top part of a feed neck comprised by the grinder used for comminution by using a horizontal airflow, by means of which air access into the grinder is reduced as well as gas and ore dust that have risen to the top part of the feed neck of the grinder are removed. In an embodiment, the exit of carbon dioxide through the feed neck 300 is prevented by forming an air wall 302 to the top part of the feed neck 300 with a horizontal airflow. With the air wall 302, access of air with the flow of ore rock to the grinder is also reduced. Carbon dioxide as a gas heavier than air sinks by way of gravity to the lowest parts of the grinder, displacing air out of the grinder through the ore feed neck. However, so that carbon dioxide could not exit from the grinder through the ore feed neck to a closed industrial hall, for example, carbon dioxide risen to the top part of the feed neck of the grinder may also be effectively removed by making use of an air wall made to the top part of the feed neck with a gas exhaust fan.

Dust formation from ore rock is a common problem in using dry comminution. An air wall implemented at the feed neck of a grinder also allows the prevention of ore dust going out of the grinder through the feed neck. Ore dust may be separated from the gas flow exiting the blower of the air wall by making used of various gas purification techniques such as centrifugal and wet separation, as well as various filtering methods such as hose and electric filtering. The separated fine ore may then be returned to the product of the comminution circuit. Harmful gases blown out of the process must also be controllably led outdoors through a high chimney, for example, and if need be, exhaust gas washing may also be utilised.

Carbon dioxide gas is obtained form the gas system 290 for which there is external carbon dioxide feed 291 and valve 292. In connection with the gas system, an embodiment has a pressure balancing arrangement 293 (a gas-tight sack or other structure filling in the ambient atmospheric pressure), to be explained in more detail below. The gas system 290 and the bottom part of the column 280 may be connected through a channel 294, in addition to which there may be a compressor 295.

The gas system 290 providing carbon dioxide and the flotation beneficiation arrangement 240 are connected through the channel structure 297-298, in addition to which there may be a compressor 299 such as a low-pressure compressor.

Reference number 261 denotes a carbon dioxide inlet (such as a pipe fitting) on the outlet side of the comminuting device 210. Other inlets for feeding carbon dioxide are denoted by the aforementioned reference numbers 262-263 through which carbon dioxide through the aforementioned channel structure 297-298 has access to the cells 241-243, 244-246 of the flotation beneficiation arrangement. Reference number 264 denotes an inlet for bringing carbon dioxide to the classifier 220.

Also in the case of FIG. 2, in an embodiment the beneficiation system is such that the beneficiation system comprises a circulation arrangement 2110, 290 to circulate the carbon dioxide obtained from the flotation beneficiation system 240 for reuse in the beneficiation system. The circulation arrangement comprises a channel structure 2110 by means of which carbon dioxide may be collected from the cells 241-243, 244-246 of the flotation beneficiation arrangement for the gas system 290 which may be interpreted as being part of the circulation system. Carbon dioxide may be further led from the gas system 290 both to the column 280 through the channel 294 and compressor 295 and also back to the flotation arrangement 240 through the channel structure 297-298 and the inlets 262, 263 at their ends. When viewed as a method, the method involves circulating the carbon dioxide output from the flotation beneficiation step back for use, for example to the flotation beneficiation step for the flotation beneficiation arrangement 240 and/or column 280 where carbon dioxide oversaturated pressurised water is made. A connecting channel 240 connects the cell groups of different flotation steps.

In an embodiment, the beneficiation system comprises a pressure balancing arrangement 293, 293*a* (channel), 292 (valve) to perform pressure balancing to balance the gas pressure of the flotation beneficiation arrangement 240 to substantially match the ambient atmospheric pressure.

In FIG. 2, too, in an embodiment the beneficiation system comprises a circulation arrangement for circulating the water used in the flotation beneficiation arrangement 240 for reuse in the beneficiation system. Structures allowing water circulation may be considered to be the channel 228 arranged to bring process water to the pump tank 224 after the classifier 220, behind the classifier 220 and channel 212*b*. In addition, structures allowing the water circulation in question may be considered to include inlets 280*b*, 280*c* which bring circulated water to the column.

Last, it is noted that with the method and system the oxidation conditions may be managed in the entire beneficiation process when water treated with carbon dioxide in the column 80 is circulated through comminution, classification, and flotation to thickening of the concentrates and back to carbon dioxide treatment which, as mentioned, takes place in the column 80. To guarantee the management of oxidation conditions, carbon dioxide gas, too, is circulated from the pressure balancing system to the comminution and flotation circuit and back to carbon dioxide pressure balancing. Because in the inventive method the water fed in the flotation circuit is oxygen-free and because the surfaces of the ore particles have not oxidised before the flotation step, it is simple to keep the gas phase of the flotation circuits oxygen-free by maintaining a closed gas circulation, that is, oxygen-free air or carbon dioxide circulation. The carbon dioxide needed in the flotation beneficiation is relatively simple to produce from the exhaust gases of a power plant or lime furnace of a mine with a water absorption method according to, for example, patent EP2928585 Bl.

It is advantageous to use carbon dioxide as a flotation gas because the separation of a plurality of minerals is facilitated due to the special characteristics of carbon dioxide. Due to its good solubility, even the slightest overpressure and mixture of carbon dioxide saturated sludge generates plenty of small bubbles in the liquid phase, and in addition on the hydrophobic surfaces of the ore particles carbon dioxide bubbles of the nanometre and micrometer size begin to form. As a result, the flotation of small hydrophobic particles takes place and is enhanced. The flotation of fine particles that remain unflotated in the normal air flotation is successful with carbon dioxide by using prior art carbon dioxide saturated sludge in pressure reduction flotation. The flotation process of very fine particles may use a power mixing conditioning method of carbon dioxide saturated sludge. In such a method, gas cores and nanobubbles are generated on the surfaces of very small hydrophobic minerals based on cavitation. When bound by these bubbles, particles of even less than a micrometre form aggregates that are flotatable either with the pressure reduction flotation described in the above or with flotation in the normal pressure.

The inertness of ore in comminution significantly facilitates the circulation or waters of a flotation beneficiation plant and reduces deposits and dissolved components formed in waste waters and often threating the environment. In sulphide ores, the formation of sulphates is reduced and at the same time the formation of gypsum sediment in clarification basins is reduced. By enhancing thickening and filtering, with the method according to the embodiments described herein the closing rate of circulation of process waters is significantly increased.

In the disclosed embodiments, ore is comminuted into a suitable particle size for flotation in a substantially oxygen-free environment created with carbon dioxide. As the flotation gas, carbon dioxide is primarily used, and/or in certain embodiments nitrogen. The gas used is circulated in a closed circulation from the gas pressure balancing arrangement 93, 90 to the flotation arrangement and back. The special chemical and physical properties of carbon dioxide may be utilised to improve the management and adjustment or the beneficiation process. Achieved is an enhancement in the ore oxidation, pH control, flotability of small particles, and water treatment.

In embodiments in which carbon dioxide cannot be used in flotation due to the pH, reusable nitrogen may be used as the inert gas. In an embodiment of the method, nitrogen or air is fed to the flotation beneficiation step to displace oxygen. The external gas used for circulation may in an embodiment be air because the easily oxidized sulphide ore particles in the flotation cells quickly consume the oxygen added in a closed circulation, leaving nitrogenous circulation gas mixture. In an embodiment a separate nitrogen production unit is therefore not necessarily needed. Carbon dioxide is not necessarily suitable due to the formation of carbonic acid for the flotation of all minerals, due to the pH-dependability of the reactions taking place in flotation. The formed carbonic acid may disadvantageously reduce the pH value in flotations, and in such a case, instead of carbon dioxide, nitrogen beneficiation may be used in flotation to displace oxygen. In many cases, it is useful to use separate carbon dioxide and nitrogen gas circulations in the flotation steps of different pH ranges, in other words a semigas solution is applied.

Figure 5:
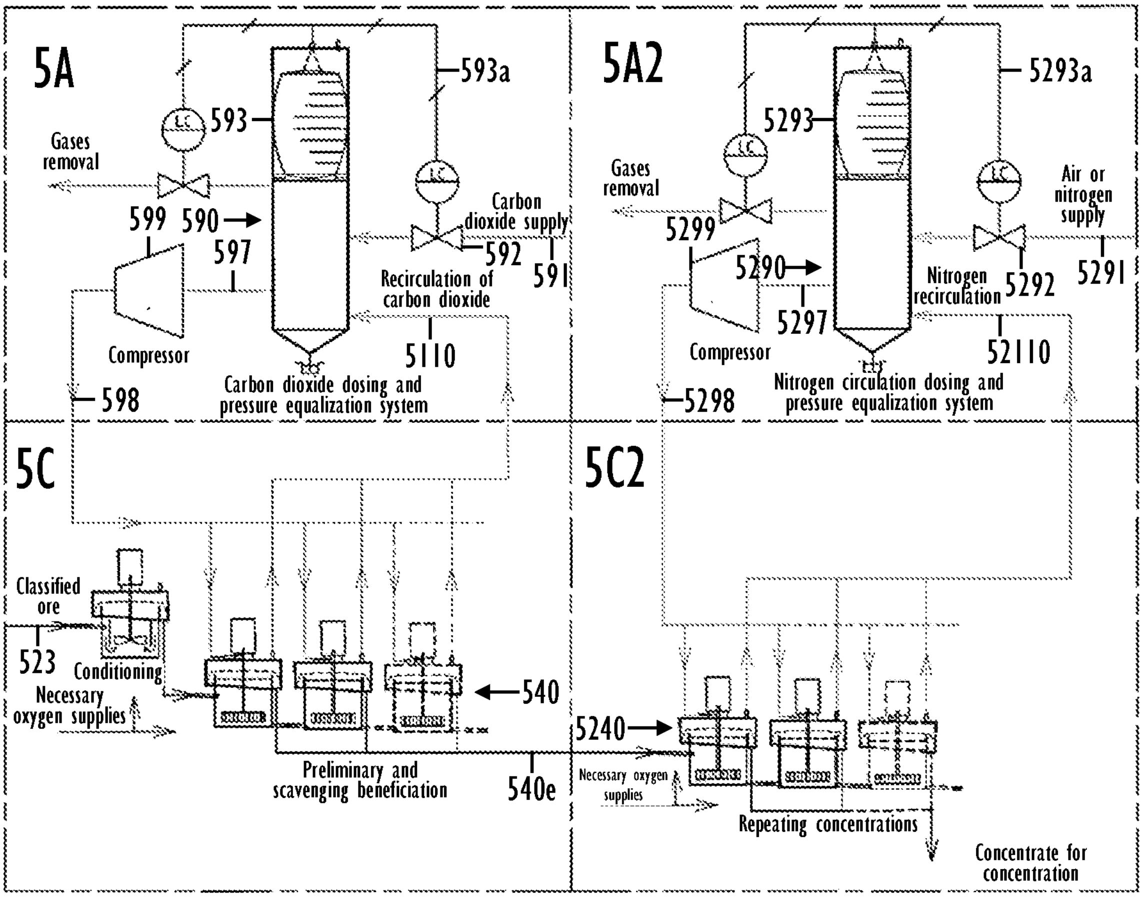
FIG. 5 shows a semigas solution having closed nitrogen and carbon dioxide circulations separate from each other.

In an embodiment, the apparatus additionally comprises a second beneficiation unit for producing or transferring air or nitrogen gas and at least one outlet which is adapted to connect the second beneficiation unit to the ore flotation beneficiation step. FIG. 5 shows a semigas solution of the type referred to in the above, in which carbon dioxide and nitrogen have separate gas circulations. In this solution, in addition to the carbon dioxide beneficiation unit described in the above, a nitrogen beneficiation unit may be used in the manner described below. The figure is divided into blocks according to functional subassemblies, which are: block 5A comprising the carbon dioxide feed and circulation system or carbon dioxide beneficiation unit, block 5A2 comprising nitrogen feed and circulation system or nitrogen beneficiation unit, mineral flotation beneficiation implemented with carbon dioxide circulation in block 5C, and mineral flotation beneficiation implemented with nitrogen circulation in block 5C2.

Block 5A of carbon dioxide feed and circulation system comprises a gas system 590 for which there is an external carbon dioxide feed 591 and valve 592. In connection with the gas system, an embodiment has a pressure balancing arrangement 593 (a gas-tight sack or other structure filling in the ambient atmospheric pressure) corresponding to the one referred to in the above and a channel 593*a*. The gas system 590 providing carbon dioxide and the flotation beneficiation arrangement 540 are connected through a channel structure 597-598, in addition to which there may be a compressor 599. The circulation of carbon dioxide back from the flotation beneficiation arrangement 540 is implemented with a channel 5110.

Correspondingly, block 5A2 of the carbon dioxide feed and circulation system comprises a gas system 5290 for which there is an external air or nitrogen feed 5291 and valve 5292. In connection with the gas system, an embodiment has a pressure balancing arrangement 5293 (a gas-tight sack or other structure filling in the ambient atmospheric pressure) corresponding to the one referred to in the above and a channel 5293*a*. The gas system 5290 providing nitrogen and the flotation beneficiation arrangement 5240 are connected through a channel structure 5297-5298, in addition to which there may be a compressor 5299. The circulation of nitrogen back from the flotation beneficiation arrangement 5240 is implemented with a channel 52110.

In the case of FIG. 5, the flotation circulation arrangement 540 of block 5C comprises conditioning as well as a preliminary and scavenging beneficiation, and the flotation beneficiation arrangement 5240 of block 5C2 comprises repeating beneficiation. A connecting channel 540*e* connects the cell groups of these flotation steps. Classified ore is brought to the flotation arrangement 540 in the channel 523.

For example, in a method according to an embodiment of the invention, the oxygen potentially needed in flotation is for the most part fed in the conditioning of flotation or as needed during flotation. Oxygen must be interpreted as a flotation chemical in the method, whose desired effect may be, for example, to ensure the adsorbing of the collector chemical, such as xanthan. However, the surface of minerals need to be oxidised up to an extent at which an adequate adsorption degree for the flotation of this mineral is necessary. If xanthan is known to adsorb on the surface of a mineral based on an electrochemical mechanism, it is enough that before flotation, oxygen feed is used to adjust the redox potential of the sludge to a level at which the flotation of this mineral occurs. Oxygen feed may be implemented in a targeted manner by mixture-injecting some oxygen with the xanthan solution.

The method also has the feature that there is dissolved carbon dioxide in the sludge flowing in the entire beneficiation circuit and that part of sludge flow is slightly pressurized. In part of the flow, such as before the flotation step, carbon dioxide dissolving may reach a saturation point and, in addition, the sludge flow may be slightly pressured to produce small bubbles, or nanobubbles and microbubbles and further gas solids agglomerates into the flotation cell.

To enhance the flotation of the hydrophobic valuable mineral particles comminuted in the flotation arrangement 40, the method keeps the carbon dioxide oversaturated feed sludge (ore sludge) under overpressure and the feed sludge is mixed, thus generating small bubbles in the liquid phase and, in addition, nano- and micrometer-sized carbon dioxide bubbles are generated on the hydrophobic surfaces of the valuable mineral particles.

The carbon dioxide beneficiation unit described in the above may be incorporated into the beneficiation system described in the above as early as the construction phase. Alternatively, the carbon dioxide beneficiation unit may be retrofitted in an existing apparatus, which includes the aforementioned ore comminution, classification, and flotation beneficiation steps. In such a case, it is also possible to retrofit the necessary connections (inlets) to the apparatus, into which the carbon dioxide beneficiation unit is installed so that the carbon dioxide feed described in the above is implemented, and in some embodiments, the recovery. As described in the above, in some embodiments the beneficiation unit also includes a nitrogen beneficiation unit, which may be installed according to the same principles.

Those skilled in the art will find it obvious that, as technology advances, the basic idea of the invention may be implemented in many different ways. The invention and its embodiments are thus not restricted to the above-described examples but may vary within the scope of the claims.

The invention claimed is:

1. A method for a beneficiation process of minerals, the method comprising the steps of:

comminuting ore which contains valuable minerals;

generating an air wall, by an exhaust blower, to the top part of a feed neck comprised by a grinder used for comminution by using a horizontal airflow, via which air access into the grinder is reduced as well as gas and ore dust that have risen to the top part of the feed neck of the grinder are removed;

performing a classification wherein ore of too large a particle size is returned to the comminuting step, and ore of a desired particle size is directed onwards to a following step of the method, wherein the comminuted ore is beneficiated by flotation for separating valuable minerals;

feeding, in order to displace oxygen, carbon dioxide oversaturated water and/or carbon dioxide gas to at least one of the following process steps: ore comminution, classification of comminuted ore, intermediate step between comminution and classification, feeding of the comminution and/or classification;

circulating output carbon dioxide from the flotation beneficiation step back to the flotation beneficiation step through a pressure balancing arrangement; and performing pressure balancing to balance the gas pressure of flotation beneficiation cells used in flotation beneficiation to match the normal ambient air pressure for compensating an effect of a change in a water level of the flotation cells on a volume of gas circulation may be without a need to blow out gas.

2. A method as claimed in claim 1, wherein carbon dioxide oversaturated water and/or carbon dioxide gas is fed into both the ore comminution step and ore classification step.

3. A method as claimed in claim 1, further comprising:

feeding carbon dioxide to the flotation beneficiation step to displace oxygen, and carbon dioxide recovery via which the carbon dioxide output from the flotation beneficiation step is circulated back to the beneficiation process.

4. A method as claimed in claim 1, further comprising post-treatment of a process water of the flotation beneficiation process, in which continuous nanofiltration is performed for the process water, via which substances dissolved in the process water are separated from it.

5. A method as claimed in claim 4, wherein the post-treatment of process water additionally comprises: gypsum precipitation, aeration, hydroxy precipitation, carbonation precipitation, and a second nanofiltration via which substances dissolved in the process water are separated from it.

* * * * *